United States Patent [19]
Baumann

[11] Patent Number: 5,424,710
[45] Date of Patent: Jun. 13, 1995

[54] POWER COUPLER FOR COUPLING POWER FROM A TRANSMISSION LINE TO A NODE THEREON

[75] Inventor: Donald D. Baumann, San Jose, Calif.

[73] Assignee: Echelon Corporation, Palo Alto, Calif.

[21] Appl. No.: 91,877

[22] Filed: Jul. 14, 1993

[51] Int. Cl.⁶ .......................................... H04M 11/04
[52] U.S. Cl. .................... 340/310.01; 370/85.3; 370/28; 340/310.02; 340/310.03; 340/310.06; 340/310.07; 340/825.52
[58] Field of Search ........ 340/310 A, 310 R, 310 CP, 340/825.52; 370/85.1, 85.3, 27, 28

[56] References Cited
U.S. PATENT DOCUMENTS

| | | | |
|---|---|---|---|
| 3,983,323 | 9/1976 | Griffith et al. | 370/28 |
| 4,918,690 | 4/1990 | Markkula, Jr. et al. | 370/94 |
| 5,148,144 | 9/1992 | Sutterlin et al. | 340/310 A |
| 5,257,006 | 10/1993 | Graham et al. | 340/310 A |

Primary Examiner—Brent Swarthout
Assistant Examiner—Nina Tong
Attorney, Agent, or Firm—Blakely, Sokoloff, Taylor & Zafman

[57] ABSTRACT

A node power isolator for connecting a node of a two conductor transmission line network such as a twisted pair line to the network so as to enable the DC powering of the node from the network itself without significantly diminishing the signal levels on the network or interfering with the node's ability to receive signals from or transmit signals on the network. Current flow through the power isolator is through a transistor coupled in series with each transmission line to node connection, with the base to emitter voltage of the transistor clamped to be substantially constant at the signaling frequencies of interest, either directly by a capacitor connected there across, another circuit having a capacitor connected between the base and the emitter of another transistor or both. Various embodiments are disclosed.

12 Claims, 5 Drawing Sheets

POWER COUPLER FOR COUPLING POWER FROM A TRANSMISSION LINE TO A NODE THEREON

BACKGROUND OF THE INVENTION

1. Field of the Invention

The present invention relates to the fields of transceivers and transceiver modules, particularly those which provide an interface between a twisted pair line and an intelligent cell, and power distribution over a data transmission medium.

2. Prior Art

Distributed-intelligence networks are known which provide sensing, communications and control, such as the network described in U.S. Pat. No. 4,918,690. This network comprises a plurality of nodes, each of which includes a cell and transceiver connected to a common medium such as a twisted pair line.

Transceivers and related components for such networks are described in U.S. Pat. No. 5,148,144 and in a publication entitled "Implementing Twisted-Pair Transceivers with Neuron® Chips", published by Echelon Corporation, August 1991.

As will be seen, the present invention provides connectivity of a node to a twisted pair transmission line to provide DC and low frequency low impedance coupling thereto so as to allow powering of the node directly from the transmission line, and at the same time presenting a high impedance on the line in the frequency band of data transmission on the line to not significantly load the same and to allow AC coupling of data between the transmission line and the node.

BRIEF SUMMARY OF THE INVENTION

A node power isolator for connecting a node of a two conductor transmission line network such as a twisted pair line to the network so as to enable the DC powering of the node from the network itself without significantly diminishing the signal levels on the network or interfering with the node's ability to receive signals from or transmit signals on the network. Current flow through the power isolator is through a transistor coupled in series with each transmission line to node connection, with the base to emitter voltage of the transistor clamped to be substantially constant at the signaling frequencies of interest, either directly by a capacitor connected there across, another circuit having a capacitor connected between the base and the emitter of another transistor or both. Various embodiments are disclosed.

DETAILED DESCRIPTION OF THE INVENTION

Figure 1:
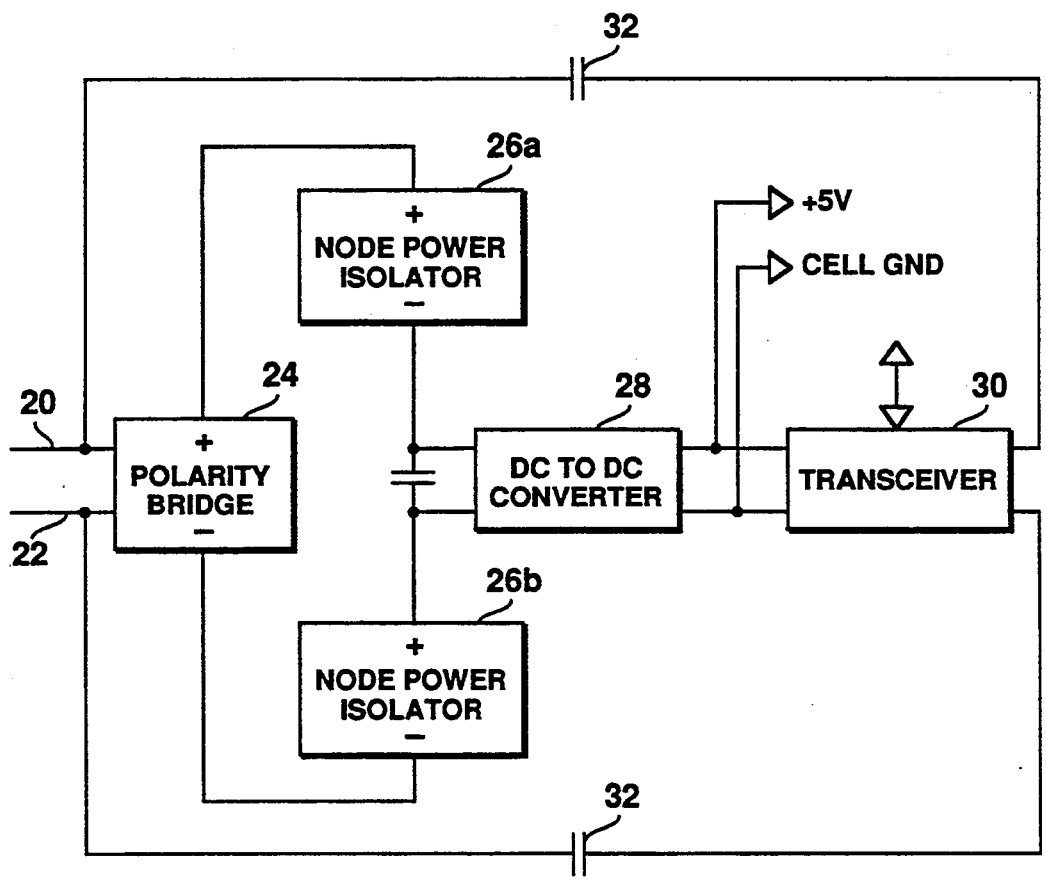
FIG. 1 is a block diagram illustrating the environment in which the present invention is intended to be used.

First referring to FIG. 1, the environment in which the present invention is intended to be used is illustrated. As shown therein, a pair of network lines 20 and 22, typically a simple twisted pair, though other forms of conductor pairs may be used, are connected to a polarity bridge 24. The network lines 20 and 22 have a DC voltage there between, and during data transmission on the network, AC data transmission signals superimposed thereon. In a preferred embodiment, a DC voltage of 42 volts is maintained between lines 20 and 22 at some location in the network, though at any particular node location such as represented in FIG. 1, the DC voltage may be somewhat lower because of loading on the network. Similarly, the AC signal levels on the line are in the order of 250 millivolts RMS, though again at any particular node, the AC signal level may be less by a significant amount depending upon the length of the line, the number of nodes on the line, the relative position of the node transmitting to the node in question, etc.

In general, the AC signals imposed between lines 20 and 22 are differential signals, the signal portion on one line being equal and in opposite phase to the signal portion on the other line, so that the same may be sensed as a difference in AC voltage between the lines at the receiving nodes. This provides high common mode rejection, as the receiver in each node will be relatively immune from noise imposed equally and of the same phase on both lines.

Figure 2:
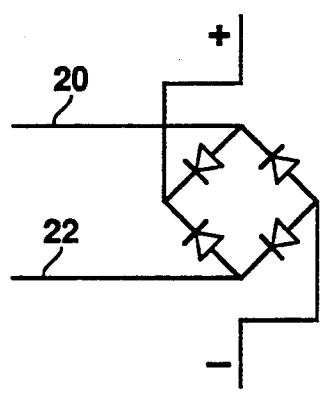
FIG. 2 is a circuit drawing for the polarity bridge 24 of FIG. 1.

The polarity bridge 24 is simply a full diode bridge as shown in FIG. 2. This allows connection of each node to the network without concern for polarity. Both the positive and negative sides of the polarity bridge output are connected to a node power isolator 26, the positive output of the polarity bridge being connected to the positive side of the node power isolator 26a and the negative output of the polarity bridge 24 being connected to the negative side of the node power isolator 26b. The node power isolators, details of which will be subsequently described herein, are connected to a DC to DC converter 28, which steps down the DC voltage output of the node power isolators, typically to 5 volts to operate transceiver 30 and perhaps other equipment associated with the node such as sensors of various kinds, etc.

For coupling signals to and from the network lines 20 and 22, transceiver 30 is AC coupled to the transmission lines through capacitors 32. Since the polarity bridge 24 will provide an AC load across the two network lines dependent upon the AC load on the output of the polarity bridge, it is particularly important that the node power isolators 26a and 26b, which preferably are of identical designs, couple DC power to the DC to DC converter 28 with an impedance preferably not significantly higher than the impedance of the network lines themselves, but at the same time present a high AC impedance to the output of the polarity bridge 24, at least within the signaling frequency range of interest. In the preferred embodiment, signaling frequencies are within a band of approximately 5 KHz to 150 KHz. In that regard, further details of such a network are disclosed in co-pending application Ser. No. 08/049,534 filed Apr. 20, 1993, entitled "Method & Apparatus for Interfacing Between a Twisted Pair and an Intelligent Cell", also assigned to the assignee of the present invention.

Figure 3:
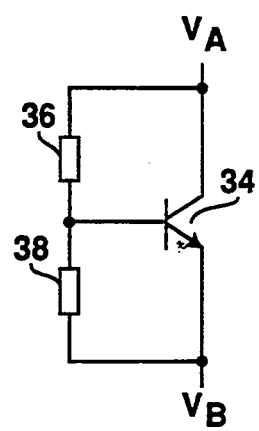
FIG. 3 is a circuit illustrating an NPN transistor connected to operate much like a zener diode.
Figure 4:
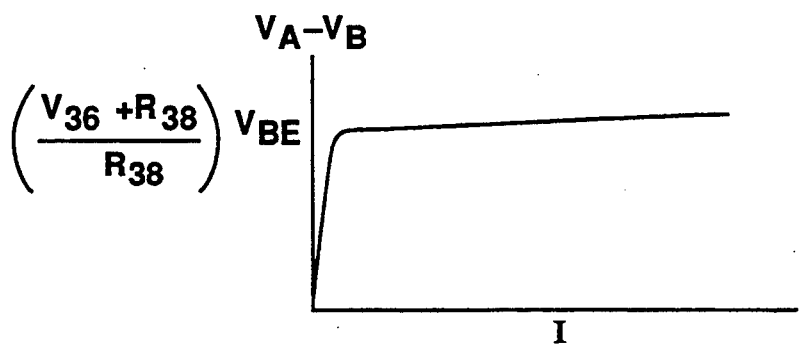
FIG. 4 is a curve showing the DC voltage—current characteristics of the circuit of FIG. 3.

Referring now to FIG. 3, there is shown therein an NPN transistor 34 with a resistor 36 connected between the collector and base of transistor 34 and the second resistor 38 connected between the base and the emitter of the transistor. In general, the transistor will be off if the voltage differential across the transistor $V_A - V_B$ (assumed positive—$V_A$ is the positive side of the circuit and $V_B$ is the negative side) is below the voltage required to bias the base of the transistor to a voltage $V_{BE}$, typically approximately 0.7 volts for a silicon transistor. More specifically, when $V_A - V_B$ times $R_{38}$ divided by $R_{36}$ plus $R_{38}$ is less than the turn on base to emitter voltage of the transistor $V_{BE}$, the current through the circuit will be equal to the sum of the leakage current through the transistor, relatively small, and the current through the series combination of resistors 36 and 38. Since the resistors 36 and 38 are relatively high resistance resistors, the current therethrough will be relatively small and proportional to the voltage there across, as may be seen in FIG. 4.

Once $V_A - V_B$ reaches the value at which transistor 34 will start to turn on, the voltage across the circuit will tend to resist further upward change. There can be large changes in the current through the transistor and thus the entire circuit for only small changes in $V_A - V_B$. In this region, the dynamic resistance, that is, the change in voltage for a change in current $\Delta V / \Delta I$ is very small.

Figure 5:
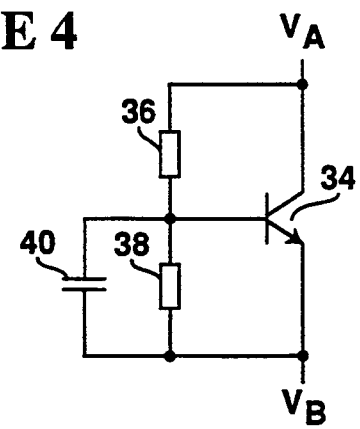
FIG. 5 shows the circuit diagram of FIG. 3 with a capacitor added thereto.

If one adds a capacitor between the base and emitter of transistor 34 of FIG. 3, as shown in FIG. 5, the characteristics of the circuit will depend upon frequency. For low frequencies wherein the impedance of capacitor 40 is much higher than the resistance of resistors 36 and 38 and the apparent collector impedance of the transistor, $1/h_{oe}$, the characteristic of the circuit will be as described before with respect to FIG. 4. In operation, the current the DC to DC converter of FIG. 1 requires, within the current load capacity of the overall system, will determine the bias and operating point of the circuit somewhere on the relatively flat portion of the curve of FIG. 4. Then as to AC signals on the network having a sufficiently high frequency wherein the impedance of capacitor 40 is much less than the resistance of resistors 36 and 38 (and the apparent base impedance of the transistor) capacitor 40 will essentially clamp the base emitter voltage of the transistor to its steady state or low frequency value. This in essence clamps the current through the transistor to the low frequency or DC operating value so that the transistor appears as a current source or sink, conducting a current which is required to power the node but being substantially immune to the high frequency variations in the voltage difference $V_A - V_B$.

Figure 6:
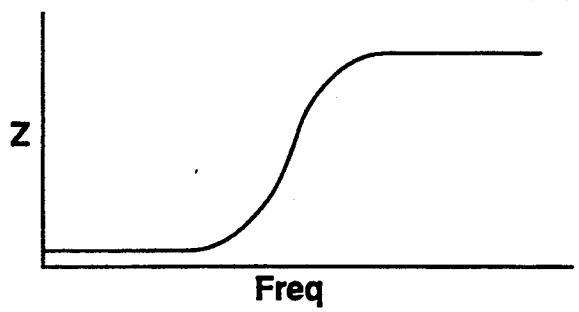
FIG. 6 is a diagram illustrating the variation of the dynamic impedance of the circuit of FIG. 5 with frequency.

At these higher frequencies, the dynamic impedance $\Delta V / \Delta I$ is large, in that the change in current for a change in voltage at high frequency is very low. This is illustrated in FIG. 6, wherein the dynamic impedance is low at low frequencies, changing to a relatively high impedance as the frequency is raised to the frequency wherein the impedance of the capacitor becomes dominate in the respective portion of the circuit. Since only a small base to emitter voltage change will result in a relatively large current change through the transistor, capacitor 40, to achieve the desired objects, needs to be a substantial capacitance to effectively clamp the base emitter voltage at the desired frequencies. However, since for an NPN transistor is shown, the base voltage will always be positive with respect to the emitter during operation, capacitor 40 may be a polarized capacitor, thereby reducing the physical size of the capacitor required. Further, of course, since the base emitter voltage of a silicon transistor can never rise much above 0.7 volts, a low rated voltage capacitor may be used, again reducing the physical size of the capacitor for the desired capacitance value.

Figure 7:
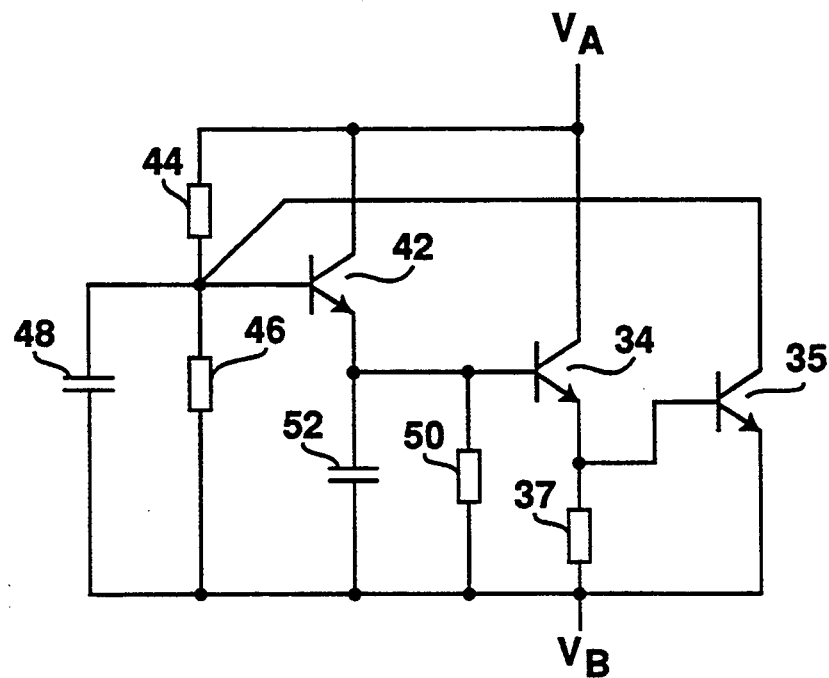
FIG. 7 is a circuit diagram showing the cascading of transistor sections of the present invention.

The net effect of resistors 36 and 38 in the circuit of FIG. 5 is that the same provides a means connected to the base of the transistor for DC biasing the base of the transistor to cause the transistor to conduct an increasing amount of current as a result of an increasing voltage between the collector and the emitter, and the capacitor provides AC decoupling between the base and the emitter of the transistor which at some frequency will become dominate so as to prevent any substantial current changes through the transistor above such frequency. However, due to the substantially constant voltage between its base and emitter, the means for accomplishing these two functions may itself be by cascading a similar circuit to the base of transistor 34, as shown in FIG. 7. Here a second NPN transistor 42 supplies a current to the base of transistor 34, the second transistor being DC biased by resistors 44 and 46. In this circuit, capacitor 48 is connected between the base of transistor 42 and the $V_B$ connection, effectively connecting the capacitor to the series combination of the base emitter voltage of transistor 42 plus the base emitter voltage of transistor 34. In that regard, in a circuit like that of FIG. 7, transistor 42 would normally be much smaller than transistor 34, possibly proportioned so that the operating current density in the two transistors is approximately the same. This would make the $V_{BE}$'s of the two transistors approximately the same during operation. In addition, resistor 50 and capacitor 52 is connected between the base and the emitter off transistor 34. Resistor 50 becomes a drain for the leakage current of transistor 42, avoiding inadvertent turn-on of transistor 34 merely from the leakage current. Also resistor 50 together with capacitor 52 together with the base impedance of the transistor, provides a frequency dependent RC circuit which at higher frequencies also further clamps the base emitter voltage of transistor 34 against variation at such frequencies, sharpening the transition from the low frequency, low impedance characteristic to the high frequency, high impedance characteristics of the impedance versus frequency curve of FIG. 6.

Also shown in FIG. 7 is a current limiting circuit comprised of transistor 35 and resistor 37, the resistor being in series with the emitter of transistor 34. Resistor 37 is selected so that as the predetermined current limit is reached, the voltage drop across the resistor will just start to turn on transistor 35. This in turn will hold down the voltage on the base of transistor 42, tending to limit the extent transistors 42 and 34 are on to limit the current through the circuit. The circuit will current limit at a current approximately equal to $0.7/R_{37}$ amps. Also while the presence of resistor 37 increases the DC impedance of the circuit, a proportional and desirable increase occurs in the AC impedance, both within an appropriate range for proper circuit operation.

Figure 8:
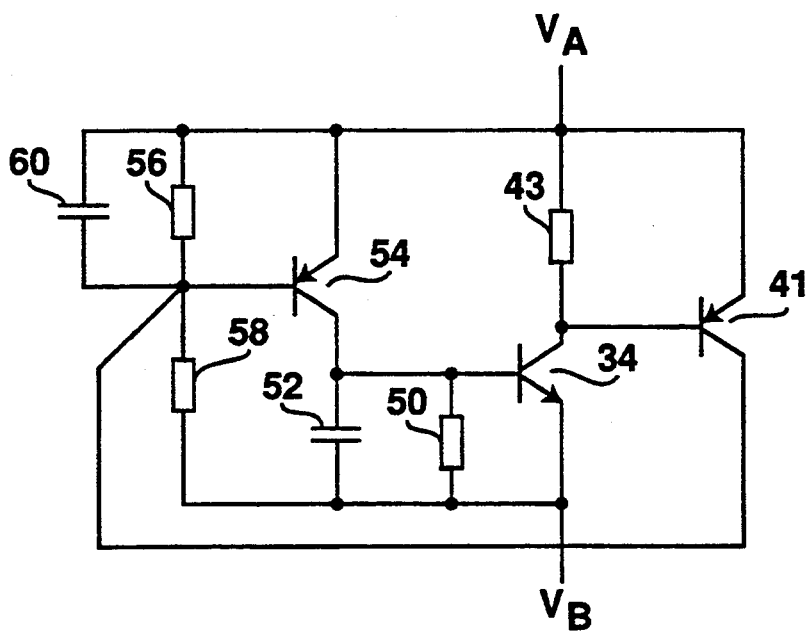
FIG. 8 is a two transistor circuit like that of FIG. 7, but uses one transistor of each conductivity type.

The circuit of FIG. 7 connects the base emitter voltage of transistor 42 and the base emitter voltage of transistor 34 in series, putting the base of transistor 42 at approximately 1.4 volts during operation. Since some headroom is required for the biasing of the base of transistor 42, typically an overall circuit in accordance with FIG. 7 will have a DC voltage drop $V_A - V_B$ of approximately 2 volts at normal operating currents. This voltage drop may be reduced, however, by using two transistors not of the same conductivity type, but rather of opposite conductivity types as shown in FIG. 8. Here the primary current carrying NPN transistor 34 has its base connected to its emitter through a parallel combination of resistor 50 and capacitor 52, as in FIG. 7, though the bias current for the base of transistor 34 is provided through a PNP transistor 54, which in turn has its base emitter voltage biased by a combination of resistors 56 and 58. Finally, capacitor 60 connected between the base and the emitter of transistor 54 provides an AC coupling between the base and the emitter to clamp the voltage at high frequencies. This circuit has the advantage of effectively cascading two RC networks, again sharpening the transition between the low frequency, low impedance characteristics of the circuit and the high frequency, high impedance characteristics (see FIG. 6). It also has the advantage that the base emitter voltages of the two transistors are not additive, so that a circuit of the type shown in FIG. 8 may operate at lower $V_A - V_B$ voltage drops than the corresponding circuit of FIG. 7. Current limiting in this circuit is achieved by the limiting current in resistor 43 tending to turn on transistor 41, limiting the extent transistors 54 and 34 may come on.

Figure 10:
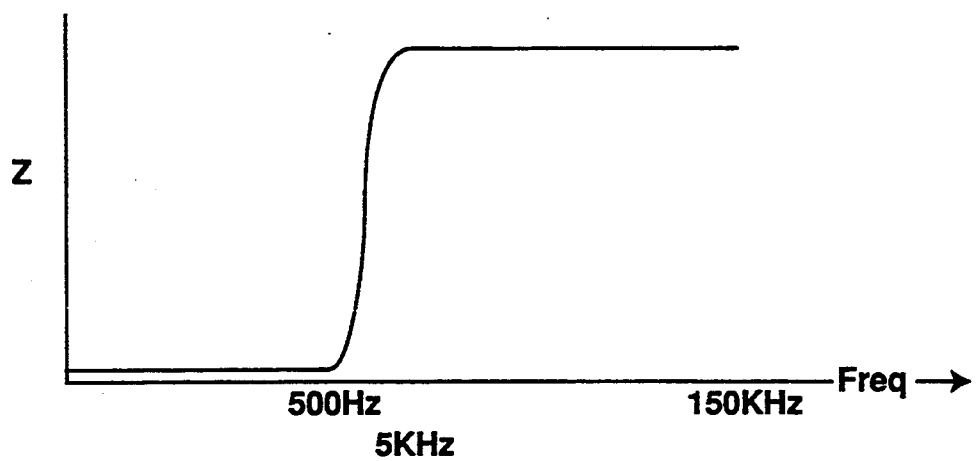
FIG. 10 is a curve illustrating the desired performance of the present invention in its intended application wherein it is desired to have the low impedance of the node power isolators of the present invention remain low substantially through 500 Hz, and be relatively fully shifted to the high dynamic impedance characteristics at approximately 5 KHz and remain at the high dynamic impedance level to at least 150 KHz.
Figure 9:
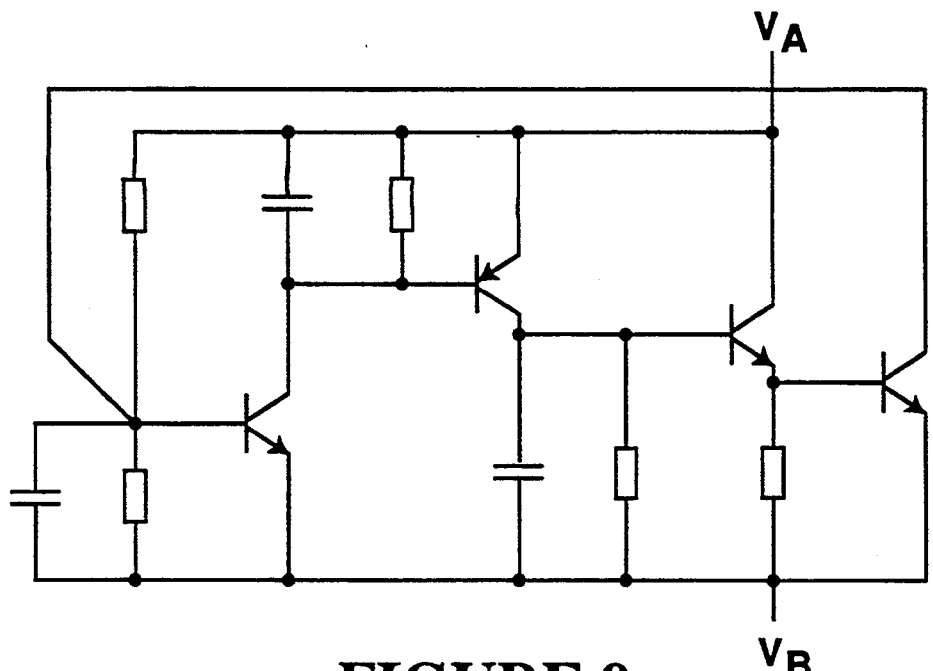
FIG. 9 is a circuit diagram wherein the circuit of FIG. 8 has been extended by one more section.

The cascading of transistor sections as in FIG. 8 may be continued as desired by alternating NPN and PNP sections without increasing the relatively low $V_A - V_B$ operating voltage drop. See for instance FIG. 9, wherein the circuit of FIG. 8 has been extended by one more section. Again, this sharpens the transition from the low frequency characteristics to the high frequency characteristics of the circuit. In that regard, as may be seen in FIG. 10, in the intended application of the present invention, it is desired to have the low dynamic impedance of the node power isolators of the present invention remain low substantially through 500 Hz, and be relatively fully shifted to the high dynamic impedance characteristics at approximately 5 KHz and remain at the high dynamic impedance level to at least 150 KHz.

Figure 11:
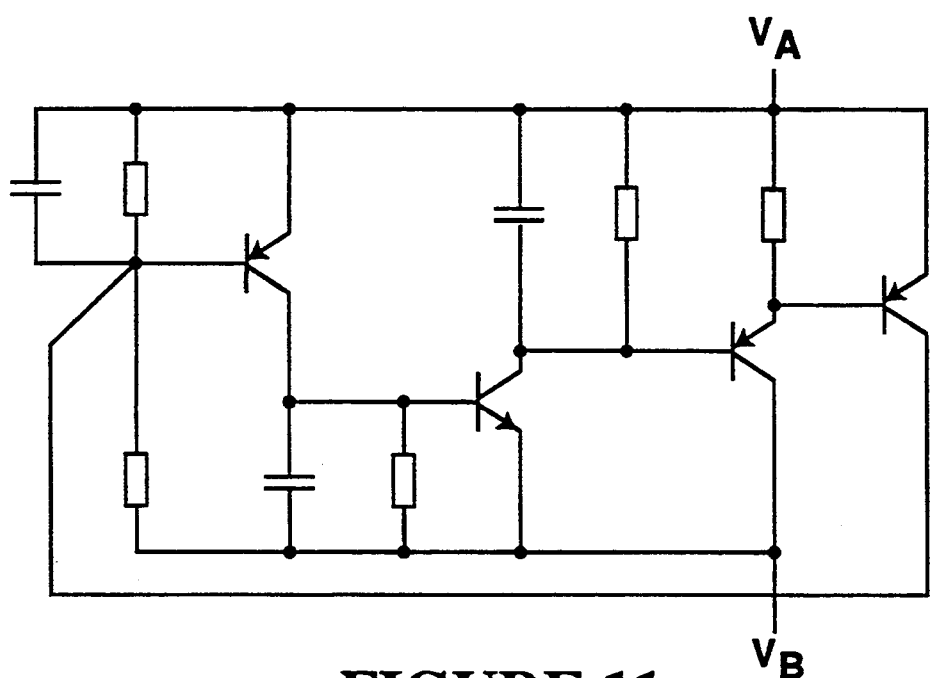
FIG. 11 is the circuit of FIG. 9 realized with transistors of opposite conductivity type.

Finally, it is to be noted that while the preferred embodiments of the invention are the circuits of FIGS. 7 and 8, any of the circuits disclosed may be readily fabricated of transistors of opposite conductivity type. By way of specific example the circuit of FIG. 11 is merely the circuit of FIG. 9 literally flipped about a horizontal axis and PNP transistors used instead of NPNs and the NPN transistors of FIG. 9 replaced with PNP transistors.

Figure 12:
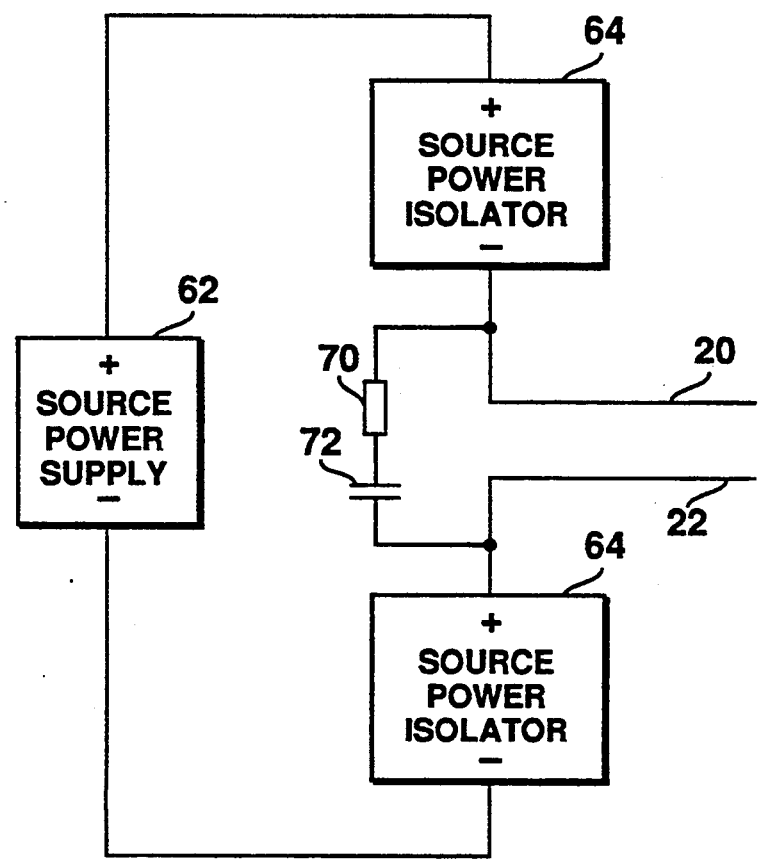
FIG. 12 is a block diagram illustrating the coupling of a source power supply to the transmission lines 20 and 22 through source power isolators 64.

Representative values for the preferred circuits of FIGS. 7 and 8 are as follows:

For FIG. 7:
$R_{37} = 10$ ohms
$R_{44} = 51$ Kohms
$R_{46} = 100$ Kohms
$R_{50} = 10$ Kohms
$C_{48} = 1.0$ $\mu f$
$C_{52} = 0.68$ $\mu f$ For FIG. 8:
$R_{43} = 10$ ohms
$R_{50} = 6.2$ Kohms
$R_{56} = 51$ Kohms
$R_{58} = 100$ Kohms
$C_{52} = 1.0$ $\mu f$
$C_{60} = 2.0$ $\mu f$ In any event, power isolators presenting an AC load to the line of 20 to 30 Kohms or higher may readily be achieved by the present invention. For putting the DC power on the line without loading the signals on the line, the same power isolators may be used, though normally of a higher power (current) capacity. This is illustrated in FIG. 12, wherein the source power supply 62 is coupled to the transmission lines 20 and 22 through source power isolators 64. Also shown is a series combination of resistor 70 and capacitor 72 to provide line termination at the signal frequencies.

While the preferred and various alternate embodiments of the present invention have been disclosed and described herein, it will be obvious to those skilled in the art that various changes in form and detail may be made therein without departing from the spirit and scope thereof.

I claim:

1. For use in a data transmission system having two transmission line conductors and a plurality of nodes, a node power isolator for connecting between a node and the transmission line to derive node power from the transmission line having a DC voltage between the two transmission line conductors on which AC data signals are superimposed during data transmission comprising:

the node power isolator having first and second connections, one of said connections for coupling to one of the transmission line conductors and the other of said connections for coupling to a transmission line node of the plurality of nodes;

the node power isolator having a transistor having an emitter, a base and a collector, the collector being coupled to the first connection and the emitter being coupled to the second connection; and, DC biasing and AC decoupling means coupled to the base of the transistor for DC biasing the base of the transistor to cause the transistor to conduct an increasing amount as a result of an increasing voltage between the emitter and the collector, and to provide AC decoupling between the base and the emitter of the transistor;

whereby a DC voltage between the first and second connections of the node power isolator will cause a DC current to flow therethrough and at the same time, the node power isolator will present a substantial impedance to said AC data signals on the transmission line.

2. The node power isolator of claim 1 wherein the DC biasing means coupled to the base of the transistor for DC biasing the base of the transistor to cause the transistor to conduct said increasing amount as a result of said increasing voltage between the emitter and the collector, and to provide the AC decoupling between the base and the emitter of the transistor comprises a first resistor and a capacitor coupled between the emitter and the base of the transistor and a second resistor coupled between the base and the collector of the transistor.

3. The node power isolator of claim 1 wherein the means coupled to the base of the transistor to provide AC decoupling between the base and the emitter of the transistor comprises: a capacitor coupled between the base and the emitter of the transistor.

4. The node power isolator of claim 1 further comprised of current limiting means to limit the DC current through the node power isolator.

5. For use in a data transmission system having two transmission line conductors and a plurality of nodes, a node power isolator for connecting between a node and the transmission line to derive node power from the transmission line having a DC voltage between the two transmission line conductors on which AC data signals are superimposed comprising:

the node power isolator having first and second connections, one of said connections for coupling to one of the transmission line conductors and the other of said connections for coupling to a transmission line node of the plurality of nodes;

the node power isolator having a plurality of transistors, each having an emitter, a base and a collector, the first transistor having its collector coupled to the first connection and its emitter coupled to the second connection;

each successive transistor of the plurality of transistors having one of its emitter and collector coupled to the base of the preceding transistor and the other of its emitter and collector coupled to one of the first and second connections, DC biasing means coupled to the base of the last of the plurality of transistors for DC biasing the base of the last transistor to cause the last transistor to conduct an increasing amount as a result of an increasing voltage between the emitter and the collector of the last transistor; and, means coupled between the base and the emitter of each of the plurality of transistors to provide AC decoupling between the base and the emitter of the last transistor;

whereby a DC voltage between the first and second connections of the node power isolator will cause a DC current to flow therethrough and at the same time, the node power isolator will present a substantial impedance to said AC data signals on the transmission line.

6. The node power isolator of claim 5 wherein the DC biasing means coupled to the base of the last of the plurality of transistors for DC biasing the base of the last transistor to cause the last transistor to conduct said increasing amount as a result of said increasing voltage between the emitter and the collector comprises a capacitor, a first resistor coupled between the base and collector of the last transistor and a second resistor coupled between the base and emitter of the last transistor, and the means coupled between the base and the emitter of each of the plurality of transistors to provide said AC decoupling between the base and the emitter of the last transistor.

7. The node power isolator of claim 5 or claim 6 wherein the plurality of transistors are all of the same conductivity type and the collectors of all the transistors are coupled to the same one of the first and second connections.

8. The node power isolator of claim 5 or claim 6 wherein the plurality of transistors are of alternating conductivity types, the collectors of all the transistors of the first conductivity type of said alternating conductivity type being coupled to the same one of the first and second connections and the collectors of all the transistors of the second conductivity type of said alternating conductivity type being coupled to the other one of the first and second connections.

9. The node power isolator of claim 5 further comprised of current limiting means to limit the DC current through the node power isolator.

10. For use in a data transmission system having two transmission line conductors and a plurality of nodes, a node power isolator for connecting between a node and the transmission line to derive node power from the transmission line having a DC voltage between the two transmission line conductors on which AC data signals are superimposed comprising:

the node power isolator having a first positive connection and a second negative connection, one of said connections for coupling to one of the transmission line conductors and the other of said connections for coupling to a transmission line node of the plurality of nodes;

the node power isolator having a plurality of transistors, each having an emitter, a base and a collector, of conductivity types alternating between NPN and PNP, the emitters of all the PNP transistors being coupled to the positive connection and the emitters of all the NPN transistors being coupled to the negative connection;

the first transistor of the plurality of said transistors having its emitter and collector in series with the first and second connections;

each successive transistor of the plurality of said transistors having its collector coupled to the base of the preceding transistor of the plurality of said transistors;

a resistor coupled between the base of the last of the plurality of transistors and the collector thereof and a resistor coupled between the base and the emitter of the last transistor thereof for DC biasing the base of the last transistor to cause the transistor to conduct an increasing amount as a result of an increasing voltage between the emitter and the collector of the last transistor; and, a capacitor coupled between the base and the emitter of each of the plurality of transistors to provide AC decoupling between the base and the emitter of the last transistor;

whereby a DC voltage between the first and second connections of the node power isolator will cause a DC current to flow therethrough and at the same time, the node power isolator will present a substantial impedance to said AC data signals on the transmission line.

11. The node power isolator of claim 10 wherein each of said transistors has a resistor coupled between its base and emitter.

12. The node power isolator of claim 10 further comprised of current limiting means to limit the DC current through the node power isolator.

* * * * *

UNITED STATES PATENT AND TRADEMARK OFFICE
CERTIFICATE OF CORRECTION

PATENT NO. : 5,424,710
DATED : June 13, 1995
INVENTOR(S) : Donald D. Baumann

It is certified that error appears in the above-indentified patent and that said Letters Patent is hereby corrected as shown below:

In column 4 at line 58 delete "off" and insert --of--

Signed and Sealed this

Seventh Day of October, 1997

Attest:

BRUCE LEHMAN

Attesting Officer

Commissioner of Patents and Trademarks